United States Patent [19]

Boyer

[11] Patent Number: 5,477,281
[45] Date of Patent: Dec. 19, 1995

[54] SNAP-ON SUNGLASSES HAVING A TENSION-EXERTING ASSEMBLY

[76] Inventor: Edward J. Boyer, P.O. Box 4785, Calabash, N.C. 28467

[21] Appl. No.: 355,830

[22] Filed: Dec. 14, 1994

Related U.S. Application Data

[63] Continuation of Ser. No. 82,389, Jun. 28, 1993, abandoned.
[51] Int. Cl.$^6$ ........................................... G02C 5/04
[52] U.S. Cl. ............................................ 351/128; 351/124
[58] Field of Search .................................. 351/128, 124, 351/68, 44, 48, 47, 57, 58, 67, 68, 71, 85, 90, 94, 129, 130, 136, 137, 125

[56] References Cited

U.S. PATENT DOCUMENTS 4,129,362  12/1978  Lorenzo .................................. 351/128

FOREIGN PATENT DOCUMENTS 712476  10/1931  France .................................... 351/48
6592    of 1896  United Kingdom ................... 351/125

Primary Examiner—William L. Sikes
Assistant Examiner—Hung Xuan Dang

[57] ABSTRACT

A new and improved snap-on sunglasses includes a first sunglass lens support assembly which supports a first lens frame portion. A first sunglass lens is supported by the first lens frame portion, and a first clamping arm assembly is supported by the first lens frame portion. A second sunglass lens support assembly supports a second lens frame portion. A second sunglass lens is supported by the second lens frame portion, and a second clamping arm assembly is supported by the second lens frame portion. The respective first and second clamping arm assemblies include respective clamping ends. A first variable length alignment assembly is connected between the first sunglass lens and the second sunglass lens, for maintaining the lenses in substantial co-linear alignment. A second variable length alignment assembly is connected between the first lens frame portion and the second lens frame portion, for maintaining the frame portions in substantial co-linear alignment. A tension-exerting assembly, which includes a spring, is connected between the first sunglass lens support assembly and the second sunglass lens support assembly. The tension-exerting assembly urges the first sunglass lens support assembly and the second sunglass lens support assembly toward each other, such that the first clamping arm assembly and the second clamping arm assembly clamp against the frame of the eyeglasses. A plurality of suction cups may be connected to the respective clamping arm assemblies. The effective lengths of the respective clamping arm assemblies are adjustable.

5 Claims, 3 Drawing Sheets

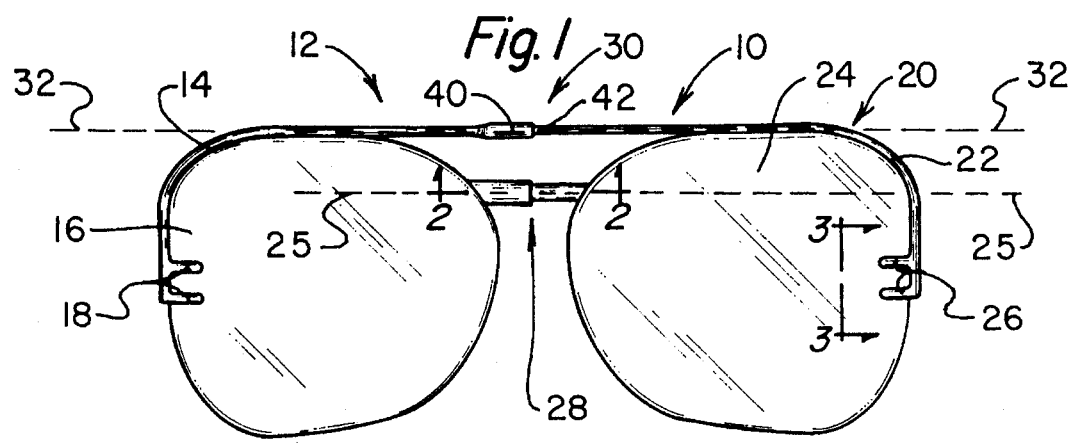
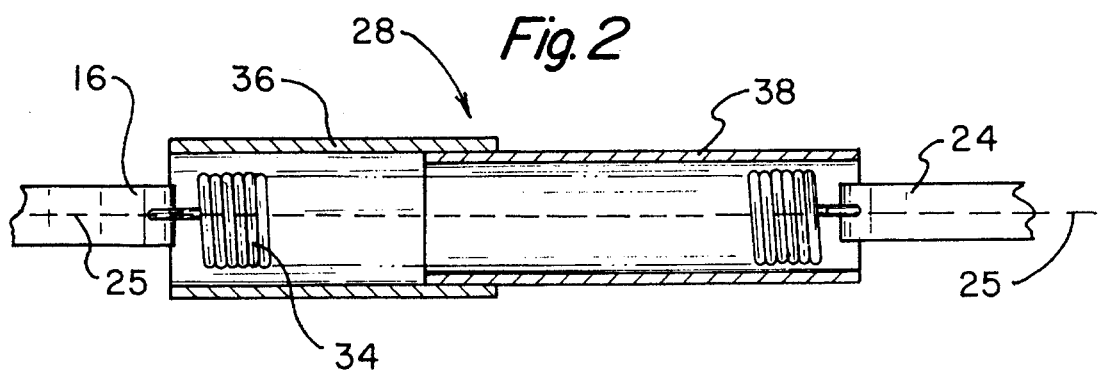

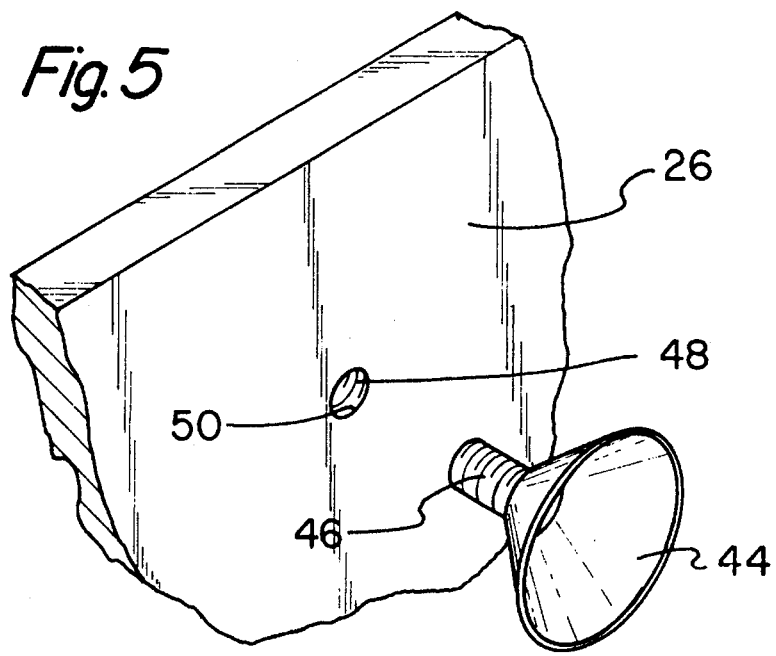
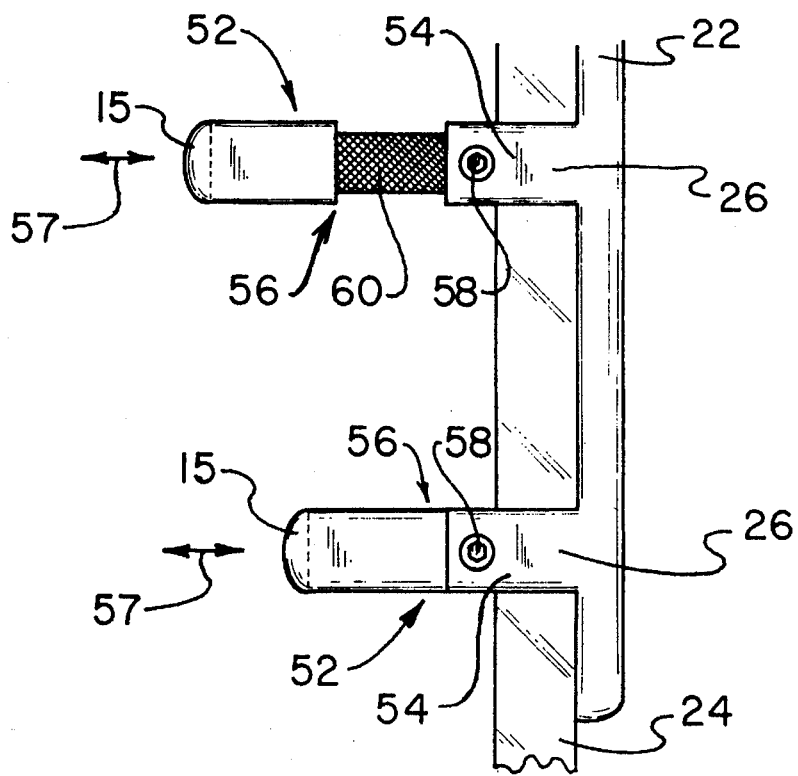

1

SNAP-ON SUNGLASSES HAVING A TENSION-EXERTING ASSEMBLY

This application is a continuation of application 08/082,389, filed Jun. 28, 1993, now abandoned.

BACKGROUND OF THE INVENTION

1. Field of the Invention

The present invention relates generally to sunglasses and more particularly, to a sunglasses device especially adapted for adding on to conventional eyeglasses.

2. Description of the Prior Art

People who wear prescription eyeglasses often have the need for sunglasses. When such is the case, a number of alternative courses of action may be taken. The person may have a pair of prescription sunglasses made. Such is an expensive undertaking. Moreover, it may prove inconvenient to carry around and take very good care of prescription sunglasses.

Another alternative is to use an auxiliary pair of sunglasses. The auxiliary sunglasses have means to attach the sunglasses to the prescription eyeglasses. The auxiliary sunglasses are not made to a prescription and do not have highly refined optical properties such as are present in prescription eyeglasses. The auxiliary sunglasses merely have sun screening properties. The auxiliary sunglasses are generally made from inexpensive plastic materials. The auxiliary sunglasses do not have temple portions and do not fit over the ears of the wearer. For these reasons, the auxiliary sunglasses are relatively inexpensive compared to the prescription eyeglasses. The auxiliary sunglasses attach to either the lens portion or the frame portion of the prescription eyeglasses. They, in essence, ride piggy back on the prescription eyeglasses.

Throughout the years, a number of innovations have been developed relating to auxiliary sunglasses that are carried piggy back by conventional eyeglasses. Many of the innovations are directed to the specific means for attaching the auxiliary sunglasses to the prescription eyeglasses. The following U.S. patents are representative of some of those innovations: U.S. Pat. Nos. 3,876,295; 3,901,589; 4,163,607; 4,247,178; and Des. 274,181.

More specifically, U.S. Pat. Nos. 3,876,295, 4,463,607, and Des. 274,181 disclose auxiliary sunglasses that clip on to lenses of conventional eyeglasses. In each patent, the clip-on mechanism exerts pressure on the lenses of the eyeglasses. As such, the eyeglass lenses can be scratched. This is especially so if a particle of dirt gets sandwiched between the clip-on device and the lenses of the eyeglasses. In this respect, it would be desirable if an auxiliary sunglasses device were provided which rides piggy back on eyeglasses without being supported by the lenses of the eyeglasses.

There is another problem associated with the use of auxiliary sunglasses that clip on to lenses of conventional eyeglasses, such as disclosed in U.S. Pat. Nos. 3,876,295, 4,463,607, and Des. 274,181. By clipping on to the lenses, the clip-on mechanism of the auxiliary sunglasses act as an obstruction to good vision. The clip-on mechanisms occupy some of the lens area and deprive the wearer of a full field of vision. In this respect, it would be desirable if an auxiliary sunglasses device were provided that rode piggy back on conventional eyeglasses without obstruction vision through the lenses of the eyeglasses.

U.S. Pat. No. 3,901,589 discloses clip-on, flip-up goggles that ride piggy back on conventional eyeglasses. In this device, a rigid auxiliary, two-lens goggles structure is provided. The right and left lenses of the goggles structure are not laterally adjustable with respect to each other. The rigid, two-lens, non-laterally-adjustable goggle structure is, however, supported by a laterally adjustable support structure. The laterally adjustable support structure includes spring-biased clamping members which clamp onto the far sides of the frame of the conventional eyeglasses. Because a non-laterally adjustable auxiliary lens structure is supported by a laterally adjustable support structure, an interface assembly must be provided between the two units. The interface unit makes the overall structure quite complex. On the other hand, if a two-lens auxiliary sunglasses device were provided that both laterally adjustable lenses and laterally adjustable support structures, then such a complex interface unit would not be necessary. In this respect, it would be desirable if an auxiliary sunglasses device were provided which includes two laterally adjustable lenses supported by a laterally adjustable lens support.

U.S. Pat. No. 4,247,178 discloses clip-on sunglasses that are supported by a bridge member of the frame of the eyeglasses. This clip-on device includes two auxiliary sunglasses lenses that are rigidly connected to each other and are not laterally adjustable. Moreover, the connection between the auxiliary sunglasses and the eyeglasses is centrally located with respect to both the auxiliary sunglasses and the eyeglasses. The central location of the attachment makes the attachment highly susceptible to destabilizing forces at the edges of the auxiliary sunglasses. A destabilizing force such as a simple bump against an edge of the auxiliary sunglasses can readily knock the auxiliary sunglasses out of alignment with the eyeglasses. In this respect, it would be desirable if an auxiliary sunglasses device were provided which is not readily susceptible to destabilization by light forces applied to the edges of the auxiliary sunglasses.

There are additional features that would be desirable in an auxiliary sunglasses device. Even though a clamping force may be exerted by an auxiliary sunglasses device laterally on the edges of a conventional pair of eyeglasses, it may be desirable if some means were used to increase frictional contact between the auxiliary sunglasses and the conventional eyeglasses so as to provide a more secure attachment between the two. In this respect, it would be desirable if an auxiliary sunglasses device were provided which had means to increase frictional contact between the auxiliary sunglasses and the edges of the conventional eyeglasses.

Lenses and frames of conventional eyeglasses vary considerably in thickness from one pair to another. If an auxiliary sunglasses is designed to fit onto relatively thin lenses and frames, then it may not be suitable for attachment to thicker lenses and frames. On the other hand, if the auxiliary sunglasses are designed to fit onto relatively thick lenses and frames, then, if the auxiliary sunglasses would be used with thinner lenses and frames, the auxiliary sunglasses may be loose and rattle around on the thinner lenses and frames. In this respect, it would be desirable if an auxiliary sunglasses device were provided which were adjustable for a range of thicknesses of eyeglass lenses and frames so that the auxiliary sunglasses engage in a snug fit for each thickness within the adjustable range.

Thus, while the foregoing body of prior art indicates it to be well known to use clip-on sunglasses for conventional eyeglasses, the prior art described above does not teach or suggest a snap-on sunglasses apparatus which has the following combination of desirable features: (1) rides piggy back on eyeglasses without being supported by the lenses of the eyeglasses; (2) rides piggy back on conventional eyeglasses without obstructing vision through the lenses of the eyeglasses; (3) includes two laterally adjustable lenses supported by a laterally adjustable lens support; (4) is not readily susceptible to destabilization by light forces applied to the edges of the auxiliary sunglasses; (5) has means to increase frictional contact between the auxiliary sunglasses and the edges of the conventional eyeglasses; and (6) is adjustable for a range of thicknesses of eyeglass lenses and frames so that the auxiliary sunglasses engage in a snug fit for each thickness within the adjustable range. The foregoing desired characteristics are provided by the unique snap-on sunglasses of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved snap-on sunglasses which serves as auxiliary sunglasses for eyeglasses that have an eyeglass frame. The apparatus includes a first sunglass lens support assembly which supports a first lens frame portion. A first sunglass lens is supported by the first lens frame portion, and a first clamping arm assembly is supported by the first lens frame portion. The first clamping arm assembly includes a clamping end. A second sunglass lens support assembly supports a second lens frame portion. A second sunglass lens is supported by the second lens frame portion, and a second clamping arm assembly is supported by the second lens frame portion. The second clamping arm assembly includes a clamping end. A first variable length alignment assembly is connected between the first sunglass lens and the second sunglass lens, for maintaining the first sunglass lens and the second sunglass lens in substantial co-linear alignment. A second variable length alignment assembly is connected between the first lens frame portion and the second lens frame portion, for maintaining the first lens frame portion and the second lens frame portion in substantial co-linear alignment. A tension-exerting assembly is connected between the first sunglass lens support assembly and the second sunglass lens support assembly. The tension-exerting assembly urges the first sunglass lens support assembly and the second sunglass lens support assembly toward each other, such that the first clamping arm assembly and the second clamping arm assembly clamp against the frame of the eyeglasses.

The first variable length alignment assembly includes a first telescopic member connected to the first sunglass lens and a second telescopic member connected to the second sunglass lens. The first telescopic member and the second telescopic member are in telescopic connection with each other, such that the respective first telescopic member and the second telescopic member of the first variable length alignment assembly provide a variable length first alignment assembly for keeping the first sunglass lens and the second sunglass lens in co-linear alignment.

The second variable length alignment assembly includes a first telescopic member connected to the first lens frame portion and a second telescopic member connected to the second lens frame portion. The first telescopic member and the second telescopic member are in telescopic connection with each other, such that the first telescopic member and the second telescopic member provide a variable length second alignment assembly for keeping the first lens frame portion and the second lens frame portion in co-linear alignment.

The tension-exerting assembly includes a spring which is connected between the first sunglass lens and the second sunglass lens. The spring is contained within respective interior portions of the first telescopic member and the second telescopic member which serve as a variable length housing for the spring.

A plurality of suction cups are connected to the respective first clamping arm assembly and the second clamping arm assembly. The suction cups provide a non-slip connection between the respective first clamping arm assembly and the respective second clamping arm assembly and the frame or lens of the eyeglasses. The suction cups may be selectively removable from and replaceable on the respective first clamping arm assembly and the respective second clamping arm assembly by first threads on the suction cups which engage complementary second threads which are inside apertures in the respective first clamping arm assembly and the respective second clamping arm assembly.

An adjustable length clamping arm assembly includes a fixed clamping portion and a movable clamping portion. The fixed clamping portion is connected to a respective lens frame portion. A locking assembly is located in the fixed clamping portion and is used for locking the movable clamping portion in a selected position with respect to the fixed clamping portion. The fixed clamping portion includes a cylindrical interior surface. The movable clamping portion includes a telescopic portion that is capable of being moved into or out of the fixed clamping portion in order to adjust an effective length of the respective clamping arm assembly. The locking assembly includes a set screw located in the fixed clamping portion, such that the set screw is capable of locking against the telescopic portion of the movable clamping portion in order to lock the respective clamping arm assembly into a selected effective length, such that the respective clamping arm assembly fits with a snug fit on the frame and/or lens of the eyeglasses for a thickness of the eyeglasses frame and/or lens within a range of adjustment of the adjustable length clamping arm assembly. The telescopic portion has a knurled surface.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved snap-on sunglasses which has all of the advantages of the prior art and none of the disadvantages.

It is another object of the present invention to provide a new and improved snap-on sunglasses which may be easily and efficiently manufactured and marketed.

It is a further object of the present invention to provide a new and improved snap-on sunglasses which is of durable and reliable construction.

An even further object of the present invention is to provide a new and improved snap-on sunglasses which is susceptible of a low cost of manufacture with regard to both materials and labor, and which accordingly is then susceptible of low prices of sale to the consuming public, thereby making such snap-on sunglasses available to the buying public.

Still yet a further object of the present invention is to provide a new and improved snap-on sunglasses which rides piggy back on eyeglasses without being supported by the lenses of the eyeglasses.

Still another object of the present invention is to provide a new and improved snap-on sunglasses that rides piggy back on conventional eyeglasses without obstructing vision through the lenses of the eyeglasses.

Yet another object of the present invention is to provide a new and improved snap-on sunglasses which includes two laterally adjustable lenses supported by a laterally adjustable lens support.

Even another object of the present invention is to provide a new and improved snap-on sunglasses that is not readily susceptible to destabilization by light forces applied to the edges of the auxiliary sunglasses.

Still a further object of the present invention is to provide a new and improved snap-on sunglasses which has means to increase frictional contact between the auxiliary sunglasses and the edges of the conventional eyeglasses.

Yet another object of the present invention is to provide a new and improved snap-on sunglasses that is adjustable for a range of thicknesses of eyeglass lenses and frames so that the auxiliary sunglasses engage in a snug fit for each thickness within the adjustable range.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a rear view showing a first preferred embodiment of the snap-on sunglasses of the invention.

FIG. 2 is an enlarged cross-sectional view of a tensioning assembly of the embodiment of the snap-on sunglasses shown in FIG. 1 taken along line 2—2 of FIG. 1.

FIG. 5 is an exploded perspective view of a second embodiment of the invention showing a removable suction cup.

FIG. 6 is a side view of a third embodiment of the snap-on sunglasses of the invention showing clamping members that can be adjusted to accommodate conventional eyeglass lenses and frames having different thicknesses.

DESCRIPTION OF THE PREFERRED EMBODIMENT

Figure 3:
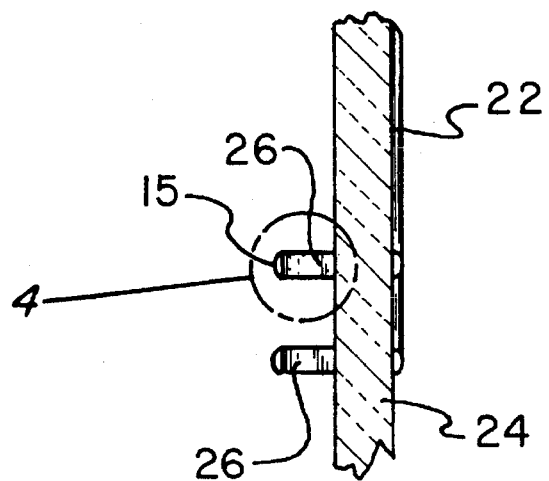
FIG. 3 is an enlarged, partial side view of a portion of the embodiment shown in FIG. 1 shown clamping members used for clamping the invention onto conventional eyeglasses.

With reference to the drawings, a new and improved snap-on sunglasses embodying the principles and concepts of the present invention will be described.

Turning initially to FIGS. 1–2, there is shown a first exemplary embodiment of the snap-on sunglasses of the invention generally designated by reference numeral 10. In its preferred form, snap-on sunglasses 10 serves as auxiliary sunglasses for eyeglasses that have an eyeglass frame. The apparatus includes a first sunglass lens support assembly 12 which supports a first lens frame portion 14. A first sunglass lens 16 is supported by the first lens frame portion 14, and a first clamping arm assembly 18 is supported by the first lens frame portion 14. The first clamping arm assembly 18 includes an L-shaped clamping end 15. A second sunglass lens support assembly 20 supports a second lens frame portion 22. A second sunglass lens 24 is supported by the second lens frame portion 22, and a second clamping arm assembly 26 is supported by the second lens frame portion 22. The second clamping arm assembly 26 includes an L-shaped clamping end 15. A first variable length alignment assembly 28 is connected between the first sunglass lens 16 and the second sunglass lens 24, for maintaining the first sunglass lens 16 and the second sunglass lens 24 in substantial co-linear alignment along first longitudinal axis 25. A second variable length alignment assembly 30 is connected between the first lens frame portion 14 and the second lens frame portion 22, for maintaining the first lens frame portion 14 and the second lens frame portion 22 in substantial co-linear alignment along second longitudinal axis 32. A tension-exerting assembly 34 is connected between the first sunglass lens support assembly 12 and the second sunglass lens support assembly 20. The tension-exerting assembly 34 urges the first sunglass lens support assembly 12 and the second sunglass lens support assembly 20 toward each other, such that the first clamping arm assembly 18 and the second clamping arm assembly 26 clamp against the frame of the eyeglasses not shown.

In operation, the snap-on sunglasses 10 of the invention is brought near a pair of eyeglasses (not shown). The apparatus 10 can be grasped between respective index fingers and thumbs of respective right and left hands. The first sunglass lens support assembly 12 may be grasped by the fight hand, and the second sunglass lens support assembly 20 may be grasped by the left hand. By pulling the first sunglass lens support assembly 12 and the second sunglass lens support assembly 20 in a direction away from each other, the tension-exerting assembly 34 is stretched and exerts a counterforce in the direction opposite to the direction of separation of the respective first sunglass lens support assembly 12 and the second sunglass lens support assembly 20. In the spread apart condition, the snap-on sunglasses 10 of the invention is placed next to a pair of eyeglasses so that the respective first clamping arm assembly 18 and the respective second clamping arm assembly 26 are placed peripheral to and in registration with respective outer edges the frame of the eyeglasses. Once the respective first clamping arm assembly 18 and the second clamping arm assembly 26 are placed in registration with the edges of the respective frame edges, the respective clamping arm assemblies are released, such that the respective clamping arm assemblies snap onto the respective edges of the eyeglasses frame by tension exerted by the tension-exerting assembly 34. To remove the snap-on sunglasses 10 of the invention, the respective clamping assemblies are grasped and pulled apart. When the respective clamping assemblies are sufficiently pulled apart, the snap-on sunglasses 10 of the invention can be removed from eyeglasses frame.

The first variable length alignment assembly 28 includes a first telescopic member 36 connected to the first sunglass lens 16 and a second telescopic member 38 connected to the second sunglass lens 24. The first telescopic member 36 and the second telescopic member 38 are in telescopic connection with each other, such that the respective first telescopic member 36 and the second telescopic member 38 of the first variable length alignment assembly 28 provide a variable length first alignment assembly for keeping the first sunglass lens 16 and the second sunglass lens 24 in co-linear alignment along the first longitudinal axis 25.

The second variable length alignment assembly 30 includes a first telescopic member 40 connected to the first lens frame portion 14 and a second telescopic member 42 connected to the second lens frame portion 22. The first telescopic member 40 and the second telescopic member 42 are in telescopic connection with each other, such that the first telescopic member 40 and the second telescopic member 42 provide a variable length second alignment assembly for keeping the first lens frame portion 14 and the second lens frame portion 22 in co-linear alignment along the second longitudinal axis 32.

The tension-exerting assembly 34 includes a spring 34 which is connected between the first sunglass lens 16 and the second sunglass lens 24. The spring 34 is contained within respective interior portions of the first telescopic member 36 and the second telescopic member 38 which serve as a variable length housing for the spring 34.

Figure 4:
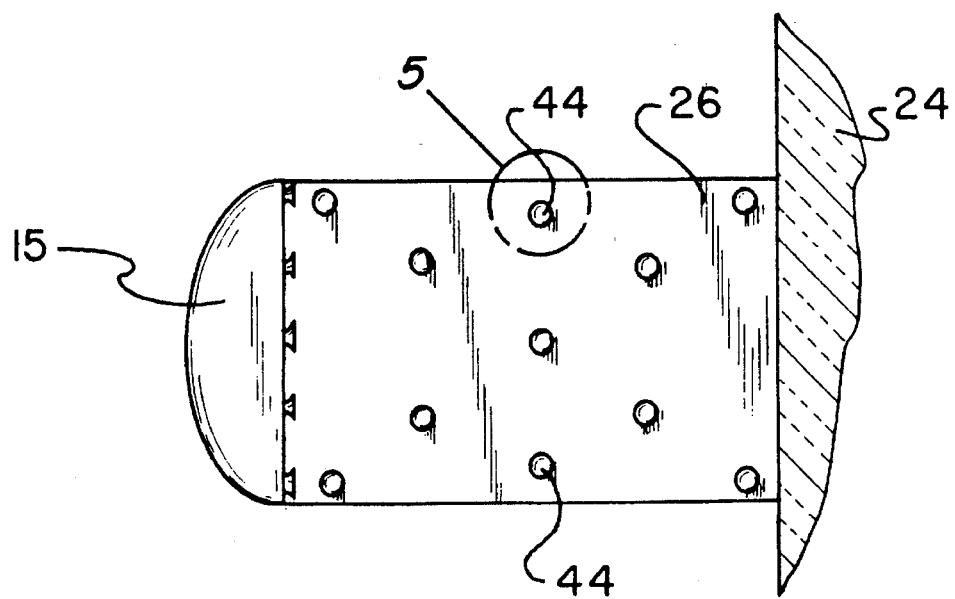
FIG. 4 is an enlarged side view, taken within the circled region 4 of FIG. 3, showing an array of suction cups used for securing the invention onto conventional eyeglasses.

Turning to FIGS. 3–5, a second embodiment of the invention is shown. Reference numerals are shown that correspond to like reference numerals that designate like elements shown in the other figures. In addition, a plurality of suction cups 44 are connected to the respective first clamping arm assembly 18 and the second clamping arm assembly 26. The suction cups 44 provide a non-slip connection between the respective first clamping arm assembly 18 and the respective second clamping arm assembly 26 and the frame or lens of the eyeglasses. The suction cups 44 increase the friction between the snap-on sunglasses 10 of the invention and the conventional eyeglasses. The suction cups 44 may be selectively removable from and replaceable on the respective first clamping arm assembly 18 and the respective second clamping arm assembly 26 by first threads 46 on the suction cups 44 which engage complementary second threads 48 which are inside apertures 50 in the respective first clamping arm assembly 18 and the respective second clamping arm assembly 26.

Turning to FIG. 6, a third embodiment of the invention is shown. Reference numerals are shown that correspond to like reference numerals that designate like elements shown in the other figures. In addition, the respective first clamping arm assembly 18 and the second clamping arm assembly 26 include respective adjustable length damping arm assemblies 52. Each respective adjustable length clamping arm assembly 52 includes a fixed clamping portion 54 connected to the respective lens frame portion. A movable clamping portion 56, is adjustably connected to the fixed clamping portion 54. The movable clamping portion 56 is capable of being moved in a longitudinal direction shown by arrows 57 with respect to the fixed clamping portion 54.

A locking assembly 58 is located in the fixed clamping portion 54 and is used for locking the movable clamping portion 56 in a selected position with respect to the fixed clamping portion 54. The fixed clamping portion 54 includes a cylindrical interior surface. The movable clamping portion 56 includes a telescopic portion 60 that is capable of being moved into or out of the fixed clamping portion 54 in order to adjust an effective length of the respective clamping arm assembly. The locking assembly 58 includes a set screw located in the fixed clamping portion 54, such that the set screw is capable of locking against the telescopic portion 60 of the movable clamping portion 56 in order to lock the respective clamping arm assembly into a selected effective length, such that the respective clamping arm assembly fits with a snug fit on the frame and/or lens of the eyeglasses for a thickness of the eyeglasses frame and/or lens within a range of adjustment of the adjustable length clamping arm assembly. The telescopic portion 60 has a knurled surface. The knurled surface increases the effectiveness of the locking action of the locking assembly 58 on the telescopic portion 60.

The components of the snap-on sunglasses of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved snap-on sunglasses that is low in cost, relatively simple in design and operation, and which may advantageously be used to ride piggy back on eyeglasses without being supported by the lenses of the eyeglasses. With the invention, a snap-on sunglasses is provided which rides piggy back on conventional eyeglasses without obstructing vision through the lenses of the eyeglasses. With the invention, a snap-on sunglasses is provided which includes two laterally adjustable lenses supported by a laterally adjustable lens support. With the invention, a snap-on sunglasses is provided which is not readily susceptible to destabilization by light forces applied to the edges of the auxiliary sunglasses. With the invention, a snap-on sunglasses is provided which has means to increase frictional contact between the auxiliary sunglasses and the edges of the conventional eyeglasses. With the invention, a snap-on sunglasses is provided which is adjustable for a range of thicknesses of eyeglass lenses and frames so that the auxiliary sunglasses engage in a snug fit for each thickness within the adjustable range.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved snap-on sunglasses which serves as auxiliary sunglasses for eyeglasses having an eyeglass frame, said apparatus comprising:

a first sunglass lens support assembly, said first sunglass lens support assembly being characterized by a first lens frame portion, a first sunglass lens supported by said first lens frame portion, and a first clamping arm assembly supported by said first lens frame portion, said first clamping arm assembly including a clamping end, a second sunglass lens support assembly, said second sunglass lens support assembly being characterized by a second lens frame portion, a second sunglass lens supported by said second lens frame portion, and a second clamping arm assembly supported by said second lens frame portion, said second clamping arm assembly including a clamping end, a first variable length alignment assembly, said first variable length alignment assembly being connected between said first sunglass lens and said second sunglass lens, for maintaining said first sunglass lens and said second sunglass lens in substantial co-linear alignment, a second variable length alignment assembly, said second variable length alignment assembly being connected between said first lens frame portion and said second lens frame portion, for maintaining said first lens frame portion and said second lens frame portion in substantial co-linear alignment, said first variable length alignment assembly defining a first longitudinal axis extending through said alignment assembly and said first and second lenses, said second variable length alignment assembly defining a second longitudinal axis extending through portions of said first and second lens frame portions, said first and second longitudinal axes being spaced from one another in a generally parallel manner, and a tension-exerting assembly, said tension-exerting assembly being connected between said first sunglass lens support assembly and said second sunglass lens support assembly, wherein said tension-exerting assembly is adapted to urge said first sunglass lens support assembly and said second sunglass lens support assembly toward each other along either said first or said second longitudinal axis, such that said first clamping arm assembly and said second clamping arm assembly clamp against the frame of the eyeglasses.

2. The apparatus described in claim 1 wherein:

said first variable length alignment assembly includes a first telescopic member connected to said first sunglass lens and a second telescopic member connected to said second sunglass lens, said first telescopic member and said second telescopic member being in telescopic connection with each other, such that said respective first telescopic member and said second telescopic member of said first variable length alignment assembly provide a variable length first alignment assembly for keeping said first sunglass lens and said second sunglass lens in co-linear alignment relative to said first longitudinal axis.

3. The apparatus described in claim 1 wherein:

said second variable length alignment assembly includes a first telescopic member connected to said first lens frame portion and a second telescopic member connected to said second lens frame portion, said first telescopic member and said second telescopic member being in telescopic connection with each other, such that said first telescopic member and said second telescopic member provide a variable length second alignment assembly for keeping said first lens frame portion and said second lens frame portion in co-linear alignment relative to said second longitudinal axis.

4. The apparatus described in claim 1 wherein:

said tension-exerting assembly includes a spring connected between said first sunglass lens and said second sunglass lens.

5. The apparatus described in claim 1 wherein:

said first variable length alignment assembly includes a first telescopic member connected to said first lens frame portion and a second telescopic member connected to said second lens frame portion, said first telescopic member and said second telescopic member being in telescopic connection with each other, such that said first telescopic member and said second telescopic member provide a variable length second alignment assembly for keeping said first lens frame portion and said second lens frame portion in co-linear alignment, said tension-exerting assembly includes a spring connected between said first sunglass lens and said second sunglass lens, and said spring is contained within respective interior portions of said first telescopic member and said second telescopic member which serve as a variable length housing for said spring.

* * * * *